April 7, 1959

R. W. SPENCER 2,881,268

STABILIZATION OF MAGNETIC AMPLIFIERS

Filed Jan. 10, 1955

INVENTOR

RICHARD W. SPENCER

BY Edwy Light

ATTORNEY 2,881,268
Patented Apr. 7, 1959

2,881,268

STABILIZATION OF MAGNETIC AMPLIFIERS

Richard W. Spencer, Philadelphia, Pa., assignor, by mesne assignments, to Sperry Rand Corporation, Philadelphia, Pa., a corporation of Delaware Application January 10, 1955, Serial No. 480,672

10 Claims. (Cl. 179—171)

The present invention relates to magnetic amplifier circuits and more particularly to the stabilization of such circuits against slow speed variations in supply voltages and against component drift.

In recent years magnetic amplifiers have been utilized in increasing numbers. The circuit configurations of such amplifiers and the systems in which they have been employed have increased accordingly. A basic circuit is the carrier type magnetic amplifier in which a carrier frequency power supply is employed. This type of amplifier utilizes one or more magnetic cores which are coupled to the carrier frequency supply. In the full wave self-saturating carrier type a pair of magnetic cores is coupled to the carrier frequency supply by a circuit including a pair of rectifiers. The cores carry a pair of power windings and a pair of signal windings, the latter of which may be energized from a pulsating signal source, for example.

Magnetic amplifiers in general are subject to slow speed variations in supply voltages and to component drift. It is accordingly a primary object of the present invention to provide a novel magnetic amplifier circuit, which compensates for such variations and drift.

A further object of the invention is to provide a novel arrangement for stabilizing magnetic amplifier circuits.

Another object of the invention is to provide an arrangement for stabilizing magnetic amplifiers against slow speed variations in supply voltages and against component drift.

An additional object of the invention is to provide a unique arrangement for stabilizing magnetic amplifiers employed in the amplification of pulses.

Briefly, the foregoing objects of the invention are realized by providing a negative feedback path between the output and the input portions of a magnetic amplifier, the feedback path having poor response to high frequencies. In a specific embodiment the feedback path may be provided by a resistor-capacitor network suitably coupled from the load impedance to the signal windings. The foregoing and other objects of the invention will become more apparent in the following detailed description of the invention taken in conjunction with the accompanying drawing wherein.

Figures 1, 2, 3:
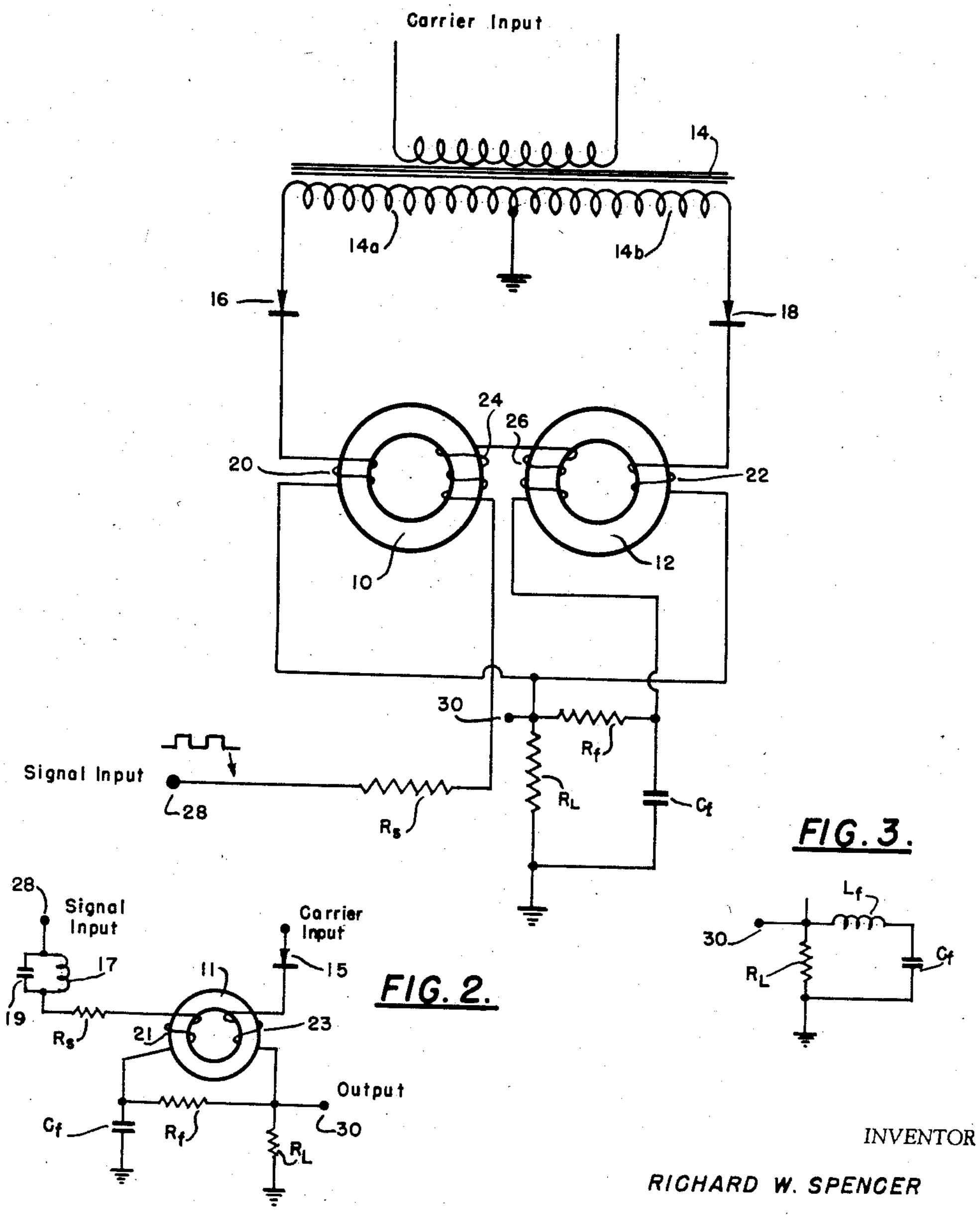
Figure 1 is a circuit diagram of a preferred form of the invention as applied to a full wave self-saturating carrier type magnetic amplifier.
Figure 2 is a circuit diagram of the invention in its broader aspects as applied to a single-ended amplifier.
Figure 3 is a circuit diagram of an alternative feedback network which may be utilized in place of the network of the preceding figures.

Referring to the drawing, reference numerals 10 and 12 designate, respectively, a pair of magnetic cores, which preferably, but not necessarily, are formed from a material exhibiting a substantially rectangular hysteresis loop. Such cores may be made from a variety of materials, among which are the various types of ferrites and various kinds of magnetic tapes, including Orthonik and 4–79

Moly-Permalloy. These materials may be heat treated to produce desired properties. The cores may be constructed in a number of geometrical configurations, including both closed and open paths. Cup shaped cores, strips of material, or toroidal coers may be used, but it is to be understood that the present invention is not limited to a specific core form or to a specific hysteresis loop configuration.

Power may be supplied to the amplifier through a carrier frequency power transformer 14, the primary winding of which is connected to a source of carrier potential, and the secondary winding of which is coupled to the respective cores through a pair of rectifiers 16, 18. The center tap of the secondary winding of the power transformer may be grounded as illustrated. Rectifiers 16 and 18 may be constituted by any of the conventional rectifiers, including crystal diodes and vacuum tubes.

Core 10 carries a power winding 20, one end of which is connected to rectifier 16 and the other end of which is connected to a load impedance $R_L$. Core 12 carries a power winding 22 connected to rectifier 18 and the load impedance in the same manner. One end of the load impedance may be grounded as indicated to complete a pair of series circuits including, respectively, the halves of the power transformer secondary winding 14*a* and 14*b*, rectifiers 16, 18, power windings 20, 22 and the load impedance $R_L$.

Cores 10 and 12 also carry signal windings 24, 26, which may be separate coils as illustrated or one continuous coil wound on both cores. The signal windings are connected in series, and one end of coil 24 is connected to a signal input terminal 28 to which may be applied a pulsating signal. The input circuit includes a resistance $R_S$. The series resistance illustrated implies a voltage source at terminal 28. It will be appreciated that a shunt input impedance could be employed in conjunction with a current source. These arrangements are equivalent if $e(t)=i(t)R_S$, where $e(t)$ is the voltage source and $i(t)$ the current source. One end of coil 26 is connected to the output circuit of the amplifier by virtue of a network including a feedback resistor $R_f$ and a condenser $C_f$. In the embodiment illustrated one end of the feedback resistor is connected to the top or high potential end of the load impedance, and the condenser is connected from the other end of the feedback resistor to ground. An output terminal 30 may be connected to the upper end of the load impedance, and the output potential may be filtered to remove carrier frequency components. The term "carrier frequency" as employed herein denotes a frequency in excess of approximately three to five times the intelligence or signal frequency, as is usually understood in the electrical arts. While no sharp line can be designated, of course, suffice it to say that the carrier frequency is sufficiently higher than the highest intelligence frequency to allow the carrier and intelligence frequencies to be readily separated by a detector and filter circuit.

Cores 10 and 12 may be biased from any suitable source of potential (not shown) which may be connected into the input or output circuit of the amplifier or coupled to the cores by separate bias windings.

If the signal windings 24, 26 were connected between input terminal 28 and ground, in the absence of the feedback resistor $R_f$ and the condenser $C_f$, the circuit would operate substantially as described in the co-pending application of Theodore H. Bonn and Richard W. Spencer, Serial No. 468,468, filed November 12, 1954, and entitled "Biased Carrier For Magnetic Amplifiers." Assuming the absence of the aforesaid feedback means and also assuming that no signal is fed to input terminal 28, the operation is as follows. When the right end of the secondary of transformer 14 becomes positive, current will flow through rectifier 18, coil 22, to the load $R_L$, inducing a potential in coil 26 which will cause a current to flow through coil 24 and revert core 10, so that during the next half cycle when the left end of the secondary of transformer 14 becomes positive, the current flowing through rectifier 16 and coil 20 will find the core in a reverted condition and will drive the same positively along an unsaturated portion of the hysteresis curve, whereby coil 20 has high impedance, and only a small current flows to the load. Since core 10 is being driven along an unsaturated portion of the hysteresis curve, there will be a large rate of change of flux, and a large potential will be induced in coil 24, which will cause flow of current through coil 26 and revert core 12 to negative remanence. On the next half cycle (the right-hand end of the secondary winding being positive) the positive pulse flowing through rectifier 18 and coil 22 will drive core 12 along an unsaturated portion of its hysteresis curve, thereby inducing potential in winding 26 which flows through coil 24 and reverts core 10 as above. Coil 22 has high impedance to the aforesaid flow of current therethrough; hence the current to load $R_L$ is small. Potential induced in one of coils 24 or 26 may effect a current flow in the other through the input circuit, which is assumed to have sufficiently low resistance to enable that result to occur. Hence, as long as there is no signal at input terminal 28, coils 20 and 22 will have high impedance and there will be substantially no current through the load $R_L$. If, however, there is a signal at input terminal 28, the signal will oppose the reverting effects of the currents in coils 24 and 26 which flow due to induction of potential in the other coil, and both cores 10 and 12 will be driven to saturation by the positive pulses flowing through coils 20 and 22 from the carrier supply, whereby coils 20 and 22 will have low impedance, and the currents will readily flow therethrough to the load.

In the embodiment illustrated in the present application resistor $R_f$ and capacitor $C_f$ constitute a negative feedback network having poor response to high frequencies, that is, a low pass network. If the input signal is constant, the resistor and capacitor serve to introduce a voltage at their junction which is proportional to the average output voltage.

The preferred embodiment is intended for the amplification of pulses in a low duty cycle. The condenser should be large enough so that the voltage across it changes negligibly during one input pulse duration. Slow speed variations at the junction of the resistor and capacitor will not be passed by the capacitor, and the voltage which builds up across the latter will serve as a negative feedback to compensate for such variations. The invention may be employed to keep the output for zero signal input near its minimum value, notwithstanding these variations.

In its broader aspects, the invention may be embodied in a single-ended amplifier. Figure 2 illustrates such an amplifier, which may comprise a single magnetic core 11, a rectifier 15 connected to a source of carrier frequency, a power winding 23 connected in series with rectifier 15 and load impedance $R_L$, and a signal winding 21 connected to an input circuit including impedance $R_S$. One end of winding 21 is connected to a feedback network, including resistor $R_f$ and capacitor $C_f$, connected to the load impedance as aforesaid. The other end of winding 21 is connected to input terminal 28 through a filter comprising condenser 19 and inductor 17 in a parallel resonant circuit. The latter circuit may be tuned to exhibit a high impedance to carrier frequency components and thus ensure the elimination of such components from the signal input circuit. As in the embodiment of Figure 1, a suitable bias supply may be provided. The bias, or other auxiliary source, may be employed to revert the core to negative remanence during the interval when the negative half-cycles of carrier potential are applied to rectifier 15.

Figure 3 illustrates an alternative feedback network, which can be utilized to give a sharper roll-off at high frequencies and accordingly more stable operation, and will permit the use of a relatively lower carrier frequency, which may be closer to the signal frequency. In this figure an inductor $L_f$ is employed in place of resistor $R_f$.

While a preferred embodiment of the invention has been shown and described, it is to be understood that this embodiment is illustrative, not restrictive of the invention. Many variations will be suggested to those skilled in the art and such variations which are in accordance with the principles of the invention are intended to fall within the scope of the following claims. It is to be noted, for example, that the invention is not limited to the particular circuit configurations illustrated, but may be employed in conjunction with positive feedback for pulse frequencies, as in a flip-flop circuit.

Having thus described my invention, I claim:

1. In combination, a magnetic amplifier having an input and an output, said amplifier including two cores of magnetic material having power winding means thereon, a high frequency energization source coupled to said power winding means and operative to drive said two cores to saturation during alternate half cycles of said energization source respectively, means for selectively applying control pulses to said input thereby to control the saturation of said cores and the output potentials appearing at the output of said amplifier, and a frequency selective feedback network between the output and input of said amplifier for coupling variations in amplifier output potential to said amplifier input, said feedback network including a capacitor connected substantially in parallel with said amplifier output for shunting high speed variations in said amplifier output potential away from said amplifier input whereby only slow speed variations in said amplifier output potential are coupled via said feedback network to said amplifier input, the size of said capacitor being sufficiently large that the voltage across it changes negligibly during occurrence of one of said control pulses.

2. In combination, a low duty-cycle magnetic amplifier comprising a core of magnetic material having power winding means and signal winding means thereon, a source of carrier potential coupled to one end of said power winding means, a load coupled at one of its ends to the other end of said power winding means, a signal source coupled to one end of said signal winding means for feeding spaced input signals to said signal winding means, and a frequency selective feedback network connected between said other end of said power winding means and the other end of said signal winding means, said network including a capacitor coupled between said other end of said signal winding means and the other end of said load, the size of said capacitor being so large that the potential across said capacitor changes negligibly during occurrence of one of said spaced input signals.

3. The combination of claim 2 wherein said network includes a resistor connected between said other end of said power winding means and said other end of said signal winding means.

4. A low duty-cycle magnetic amplifier circuit comprising a pair of magnetic cores, a source of carrier potential, power winding means linking both said cores, a pair of rectifier elements coupling said carrier source to said power winding means for coupling said cores with said source, said rectifier elements being so arranged with respect to said carrier source and with said power winding means that said pair of cores tend to be respectively driven to saturation during alternate half cycles of said carrier source, a source of pulsating signal potential having a frequency substantially lower than that of said carrier source, signal coil means linking both said cores for coupling said cores with said source of signal potential whereby said signal source is operative to control the saturation of said cores during said alternate half cycles of said carrier source respectively, a load impedance coupled to said power coil means, a feedback impedance connected between said load impedance and said signal coil means, and a capacitor connected in shunt relation to said load impedance and feedback impedance for bypassing high frequency potential variations appearing across said load impedance away from said signal coil means, the size of said capacitor being sufficiently large that the voltage across it changes negligibly during the duration of one input pulse from said signal source.

5. A magnetic amplifier circuit comprising a pair of magnetic cores, a source of high frequency carrier potential, a transformer having a primary winding, connected to said source, and a secondary winding, said secondary winding being coupled to said cores by load winding means connected via a pair of rectifiers to the ends of said secondary winding respectively, said load winding means linking both said cores, a load impedance having one end connected to said load winding means and having the other end thereof connected to a point of reference potential intermediate the ends of said secondary winding, said pair of rectifiers being so arranged with respect to said load winding means that said pair of cores tend to be respectively driven to saturation during alternate half cycles of said carrier source, a source of relatively low frequency pulsating signal potential for controlling the saturation of said cores, said signal source being coupled to said cores by signal winding means linking both said cores, and frequency selective impedance network means connected to said load impedance for establishing a source of negative feedback potential which varies in accordance with slow speed variations across said load impedance due to component drift and to slow speed variations in said carrier and signal sources, said impedance network means being relatively insensitive to high speed potential variations across said load impedance, one end of said signal winding means being connected to said source of feedback potential, said impedance network means comprising a resistor and a capacitor connected in series with one another across said load whereby one end of said series network varies in accordance with potential variations across said load impedance while the other end of said series network is connected to said point of reference potential, said signal winding means being connected to the junction of said resistor and capacitor, said capacitor being sufficiently large that the potential across it varies negligibly during the occurrence of one input pulse from said signal source.

6. In a magnetic amplifier circuit, the combination of: first and second magnetic cores, an alternating current carrier wave source, first means including a coil wound on said first core for coupling said core to said carrier wave source to produce a flux in said core in a first direction during the half cycles of one sense of said carrier wave source, second means including a coil wound on said second core for coupling said core to said carrier wave source to produce a flux in said second core in a first direction during the other half cycles of the alternating current source, signal winding means linking said first and second cores and wound in such direction that the flux produced in said first core by said one-half cycles of one sense of carrier current produces flux in a second direction opposite to said first direction in said second core and the flux produced in said second core by said other one-half cycles of carrier current produces flux in a second direction opposite to said first direction in said first core, signal control input means coupled to said signal winding means for selectively applying a signal input current to said signal winding means in opposition to the currents induced in said signal winding means by the flux produced in said cores by successive half-cycles of carrier current through said first and second coil means, a load impedance having one end thereof connected to said first and second coil means, the other end of said load impedance being coupled to a point of fixed reference potential, and frequency selective feedback means for coupling a negative feedback signal from said load impedance to said signal winding means, said feedback means comprising a feedback impedance having one end thereof coupled to said one end of said load impedance, a capacitor coupled between the other end of said feedback impedance and said point of fixed reference potential, and means connecting the junction of said feedback impedance and capacitor to said signal winding means.

7. The combination of claim 6 wherein said feedback impedance comprises a resistor.

8. The combination of claim 6 wherein said feedback impedance comprises an inductor.

9. The combination of claim 6 wherein said signal control input means is operative to produce pulsating signal input currents having a frequency substantially less than that of said carrier wave source, said capacitor being of such large size that the potential across it varies negligibly during the occurrence of one input pulse from said signal control input means.

10. In a magnetic amplifier circuit, the combination of: first and second magnetic cores, an alternating current source producing a two-phase carrier wave, first means including a coil wound on said first core for coupling said first core to one phase of said carrier wave source to produce a flux in said first core during first half cycles of said carrier wave source, second means including a coil wound on said second core for coupling said second core to the other phase of said carrier wave source to produce a flux in said second core during the other half cycles of the alternating current source, whereby said two cores respectively tend to be driven to saturation during alternate half cycles of said carrier wave source, signal winding means linking said first and second cores, a signal control input source coupled to said signal winding means for selectively applying a signal input current into said winding means thereby to control the saturation of said cores during said alternate half cycles of said carrier wave source, a load impedance having one end thereof connected to said first and second coil means, the other end of said load impedance being coupled to a point of fixed reference potential, and a frequency selective feedback network connected between said one end of said load impedance and said signal winding means for coupling a negative feedback potential to said signal winding means which feedback potential varies in accordance with slow speed potential variations across said load impedance due to component drift and to slow speed variations in said carrier wave and signal control sources, said feedback network including low pass filter means for preventing high frequency variations in potential across said load impedance from being coupled to said signal winding means.

References Cited in the file of this patent

UNITED STATES PATENTS

| | | |
|---|---|---|
| 2,561,329 | Ahlen | July 24, 1951 |
| 2,574,438 | Rossi et al. | Nov. 6, 1951 |
| 2,700,130 | Geyger | Jan. 18, 1955 |
| 2,764,719 | Woodson | Sept. 25, 1956 |